United States Patent
Burton et al.

(10) Patent No.: US 11,200,911 B1
(45) Date of Patent: Dec. 14, 2021

(54) DATA STORAGE DEVICE EMPLOYING PARTIAL CODEWORD WRITES TO MAGNETIC MEDIA

(71) Applicant: Western Digital Technologies, Inc., San Jose, CA (US)

(72) Inventors: Scott E. Burton, Westminster, CO (US); Gregory B. Thelin, Garden Grove, CA (US); Steven Vasquez, Silverado, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/175,762

(22) Filed: Feb. 15, 2021

(51) Int. Cl.
  *G11B 20/12* (2006.01)
  *G11B 20/18* (2006.01)
  *G11B 5/012* (2006.01)
  *G11B 21/08* (2006.01)

(52) U.S. Cl.
  CPC .............. *G11B 5/012* (2013.01); *G11B 21/08* (2013.01)

(58) Field of Classification Search
  CPC ......... G11B 20/18; G11B 20/12; G11B 20/14; G11B 5/54; G11B 5/59633; G11B 5/59638; G11B 20/1217; G11B 2020/232
  USPC .................................. 360/31, 53, 48, 40, 75
  See application file for complete search history.

(56) References Cited

U.S. PATENT DOCUMENTS 8,611,032 B2 * 12/2013 Champion ......... G11B 20/1879
  360/31
8,908,311 B1  12/2014 Vasquez

* cited by examiner

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a head actuated over a magnetic media comprising a plurality of data tracks, wherein each data track comprises a plurality of data sectors. A first codeword is encoded, and the first codeword is written to multiple data sectors of a first data track including a first data sector. A second codeword is encoded, and at least part of the second codeword to is written to the multiple data sectors of a second data track adjacent the first data track including a second data sector adjacent the first data sector of the first data track. The first codeword is partially written to at least the first data sector of the first data track when the first data sector of the first data track is corrupted by writing the second codeword to the second data track.

19 Claims, 6 Drawing Sheets

| DATA TRACK N | ··· | DS | DS | DS 56 | DS | ··· |
| DATA TRACK N+1 | ··· | DS | DS | DS 54 | DS | ··· |
| DATA TRACK N+2 | ··· | DS | DS | DS | DS | ··· |

FIG. 7A

| DATA TRACK N | ··· | DS | DS | DS 56 | DS | ··· |
| DATA TRACK N+1 | ··· | DS | DS | DS | DS | ··· |
| DATA TRACK N+2 | ··· | DS 58 | DS | DS | DS | ··· |

FIG. 7B

| DATA TRACK N | | | | | | |
| DATA TRACK N+1 | ··· | DS | DS | DS | DS | ··· |
| DATA TRACK N+2 | ··· | DS | DS | DS | DS | ··· |

FIG. 8A

| DATA TRACK N | | | | | | |
| DATA TRACK N+1 | ··· | DS | DS | DS | DS | ··· |
| DATA TRACK N+2 | ··· | DS | DS | DS | DS | ··· |

| DATA TRACK N | | | | | | |
| DATA TRACK N+1 | ··· | DS | DS | DS | DS | ··· |
| DATA TRACK N+2 | ··· | DS | DS | DS | DS | ··· |

FIG. 8C

DATA STORAGE DEVICE EMPLOYING PARTIAL CODEWORD WRITES TO MAGNETIC MEDIA

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 7A shows an embodiment wherein when writing a first codeword to a CMR data track the write may be aborted when an off-track condition is detected, and part of a second codeword in an adjacent data track corrupted by the off-track write is rewritten.

FIG. 7B shows an embodiment wherein when writing a first codeword to a CMR data track the write may not be aborted when an off-track condition is detected, and part of corrupted codewords in both adjacent data tracks may be rewritten.

FIGS. 8A-8C show an embodiment wherein multiple fake writes of a codeword are executed until an off-track condition is not detected, and then the codeword is written by executing a real write.

DETAILED DESCRIPTION

Figure 2:
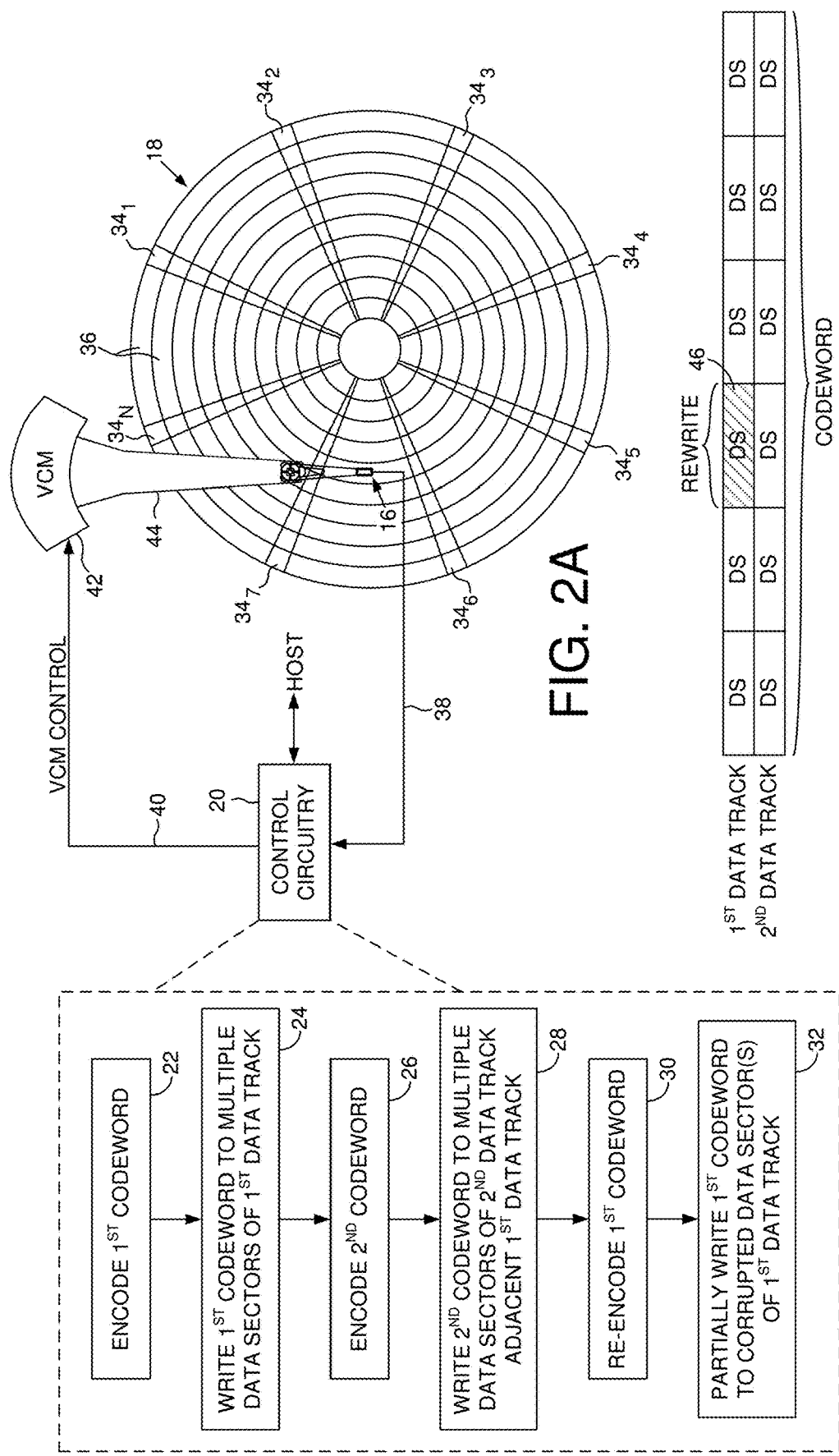
FIG. 2A shows a data storage device in the form of a disk drive according to an embodiment comprising a head actuated over a disk comprising a plurality of data tracks, wherein each data track comprises a plurality of data sectors.
FIG. 2B is a flow diagram according to an embodiment wherein when at least part of a first codeword on the disk is corrupted by an adjacent write operation, only the corrupted part of the first codeword is re-rewritten.
FIG. 2C shows part of a corrupted codeword (a corrupted data sector) being re-written.

FIG. 2A shows a data storage device in the form of a disk drive according to an embodiment comprising a head 16 actuated over a magnetic media such as a disk 18, wherein the magnetic media comprises a plurality of data tracks each comprising a plurality of data sectors. While a disk drive is used as an illustrative example herein, various embodiments of the invention may be applied to, and/or include, other types of data storage device with magnetic media such as tape drives. The disk drive further comprises control circuitry 20 configured to execute the flow diagram of FIG. 2B, wherein a first codeword is encoded (block 22) and written to multiple data sectors of a first data track including a first data sector (block 24). A second codeword is encoded (block 26) and written to multiple data sectors of a second data track adjacent the first data track including a second data sector adjacent the first data sector of the first data track (block 28). The first codeword is re-encoded (block 30) and the re-encoded first codeword is partially written to at least the first data sector of the first data track when the first data sector of the first data track is corrupted by writing the second codeword to the second data track (block 32).

Figure 1:
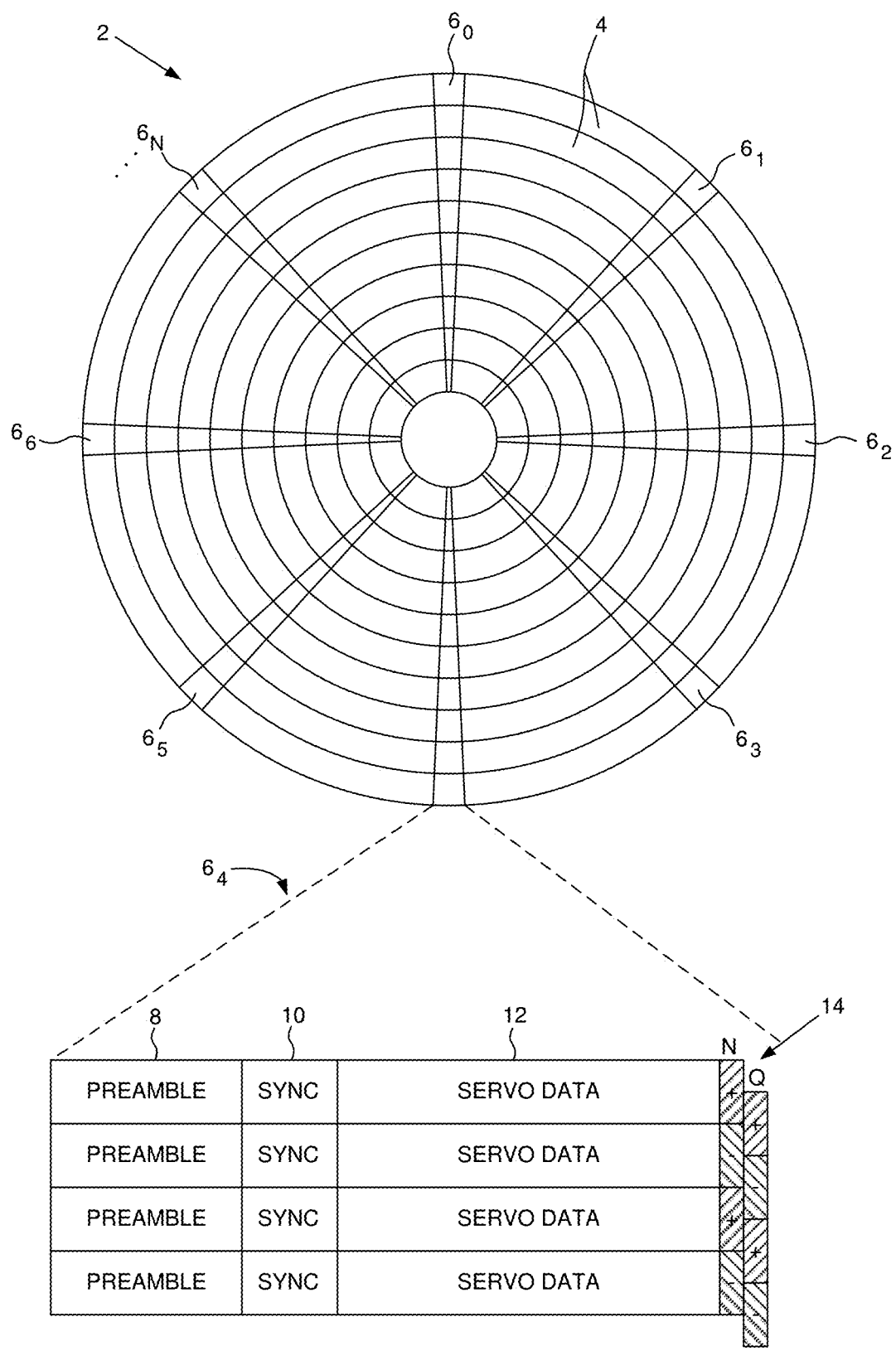
FIG. 1 shows a prior art disk format comprising a plurality of servo tracks defined by servo sectors.

In the embodiment of FIG. 2A, the disk 18 comprises a plurality of servo sectors $34_1$-$34_N$ that define a plurality of servo tracks 36, wherein data tracks are defined relative to the servo tracks at the same or different radial density. The control circuitry 20 processes a read signal 38 emanating from the head to demodulate the servo sectors and generate a position error signal (PES) representing an error between the actual position of the head and a target position relative to a target track. A servo control system in the control circuitry 20 filters the PES using a suitable compensation filter to generate a control signal 40 applied to a coarse actuator 42 (e.g., VCM) which rotates an actuator arm 44 about a pivot in order to actuate the head radially over the disk in a direction that reduces the PES. The head may also be servoed using a fine actuator, such as a piezoelectric (PZT) actuator, configured to actuate a suspension relative to the actuator arm 44, and/or configured to actuate the head relative to the suspension. The servo sectors $34_1$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

FIG. 2C shows an example of a first codeword written to six data sectors of a first data track, and a second codeword written to six data sectors of a second, adjacent data track. When writing the second codeword to the second data track, the head may move off track (e.g., due to a shock event) and corrupt a data sector 46 in the first codeword in the adjacent data track. When this happens, in one embodiment the first codeword is partially rewritten by rewriting only the corrupted data sector 46 in the first data track, thereby avoiding the possibility that a rewrite of the full codeword will corrupt previously written data sectors in the adjacent (second) data track.

A codeword may be encoded in any suitable manner using any suitable error correction code, such as with a block code (e.g., Reed-Solomon), an iterative linear code (e.g., low density parity check (LDPC)), etc. In one embodiment, the size of a codeword exceeds the size of a data sector and therefore it takes multiple data sectors to store a codeword. In one embodiment, multiple encoded codewords may be distributed over multiple data sectors using any suitable interleaving technique. For example in one embodiment, each codeword may be divided into segments, and the segments of multiple codewords may be interleave written to a plurality of consecutive data sectors. In this manner a burst error on the magnetic media affecting multiple consecutive data sectors may be spread over multiple codewords.

Figure 3:
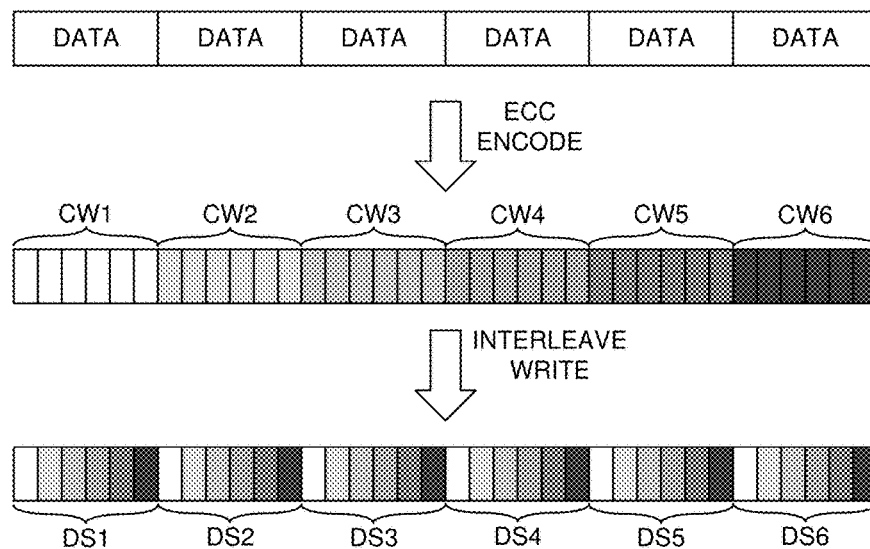
FIG. 3 shows an embodiment wherein six codewords are interleave written to six data sectors such that each data sector stores part of each codeword.

FIG. 3 shows an example of this embodiment wherein six blocks of user data are encoded into six codewords that are then interleave written to six data sectors such that each data sector stores a segment of each codeword. Other embodiments may employ a higher resolution of interleaving depending on the size of the data sectors relative to the length of burst errors and the correction power of the error correction code. In one embodiment when executing a partial write of a codeword, the user data may be re-encoded into the codewords such as shown in FIG. 3, and then during the interleave writing only the corrupted data sectors may be written. In other embodiments, the encoded codewords may be cached in memory in order to facilitate a partial write while avoiding the need to re-encode the user data.

Figure 4A:
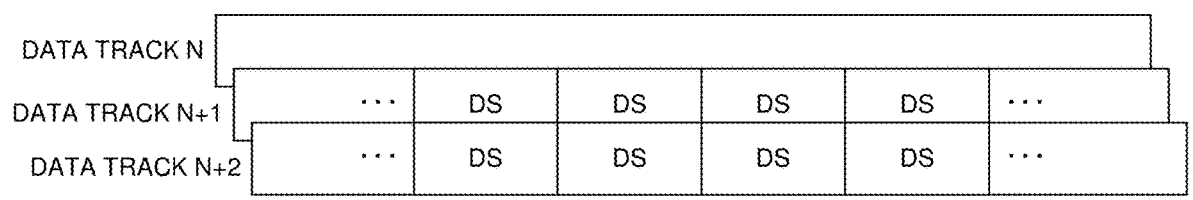
FIG. 4A shows an embodiment wherein the data tracks are written using shingle magnetic recording (SMR).
Figure 4B:
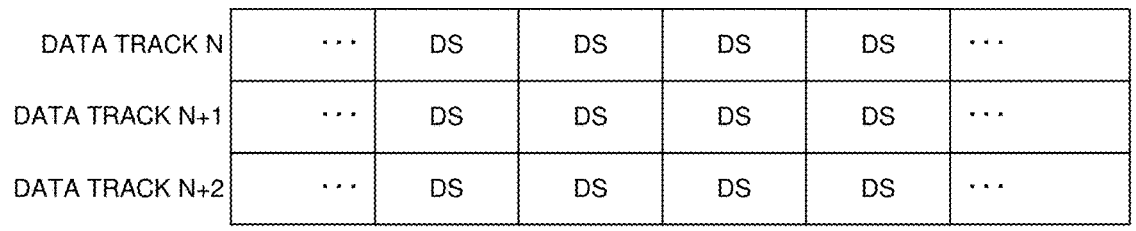
FIG. 4B shows an embodiment wherein the data tracks are written using conventional magnetic recording (CMR).

In one embodiment shown in FIG. 4A, the data tracks on the disk are written using shingle magnetic recording (SMR) wherein a previously written data track is partially overwritten by a current data track in order to form "shingled" data tracks. When writing the data tracks using SMR, the data tracks are written in a consecutive sequence as shown in FIG. 4A using dynamic addressing (e.g., log-structured writes). In another embodiment shown in FIG. 4B, the data tracks on the disk are written using conventional magnetic recording (CMR) wherein the data tracks may be written in a random order using static addressing. In either case when writing to a target data track, the head may move off track during the write and corrupt the data sectors in an adjacent data track.

Figure 5A:
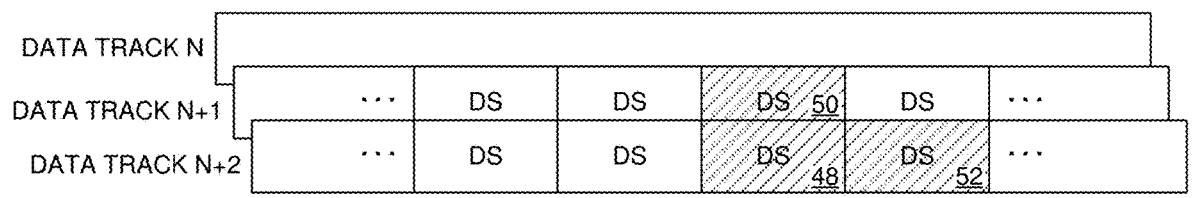
FIG. 5A shows an embodiment wherein when writing a first codeword to a current data track the write may be aborted when an off-track condition is detected.
Figure 5B:
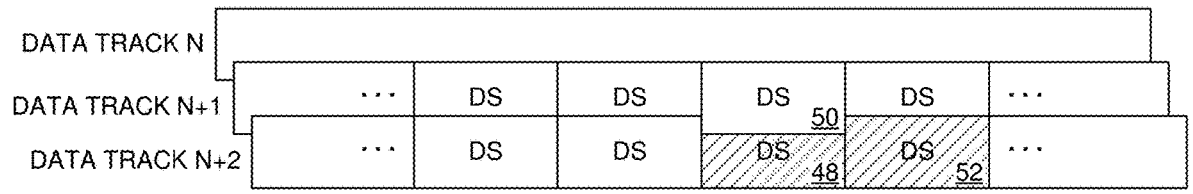
FIG. 5B shows rewriting part of a corrupted second codeword (a data sector) in a previously written, adjacent data track due to the off-track write according to an embodiment.
Figure 5C:
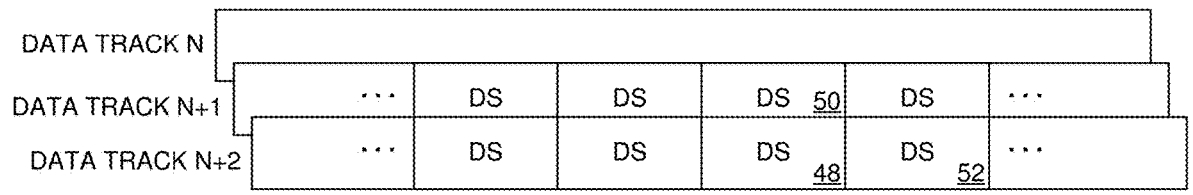
FIG. 5C shows the aborted write of the first codeword being completed by writing only the remainder of the first codeword.

FIG. 5A shows an example embodiment wherein when SMR writing data track N+2, an off-track condition may occur while writing data sector 48 causing the head to corrupt data sector 50 of the previously written adjacent data track (data track N+1). In this embodiment when an off-track condition is detected, the write to data track N+2 may be aborted such that the remaining data sectors of one or more codewords may be unwritten (e.g., data sector 52). After aborting the current write operation, the corrupted data sector 50 may be rewritten by executing a partial write of the corresponding codeword(s) as shown in FIG. 5B. After rewriting the corrupted data sector(s), the current write operation is completed by executing a partial write of the codeword(s) corresponding to the remainder of the write operation (e.g., data sectors 48 and 52 may be written with the segments of the corresponding codeword(s) as shown in FIG. 5C).

Figure 6A:
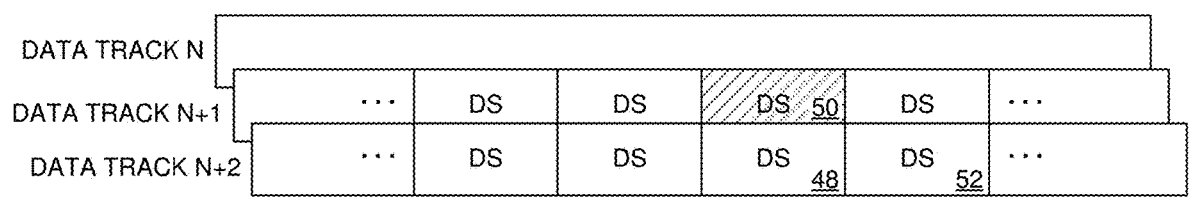
FIG. 6A shows an embodiment wherein when writing a first codeword to a current data track the write may not be aborted when an off-track condition is detected.
Figure 6B:
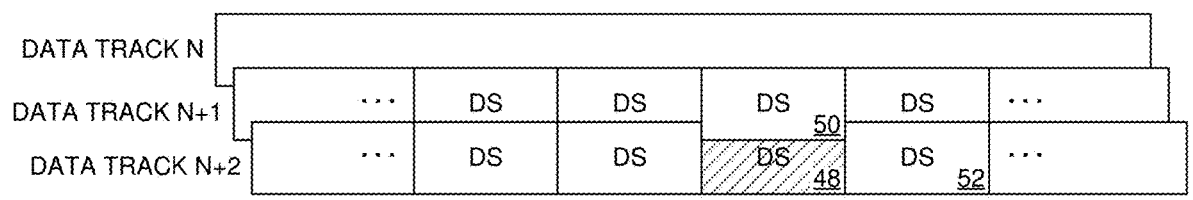
FIG. 6B shows rewriting part of a corrupted second codeword (a data sector) in a previously written, adjacent data track due to the off-track write according to an embodiment.
Figure 6C:
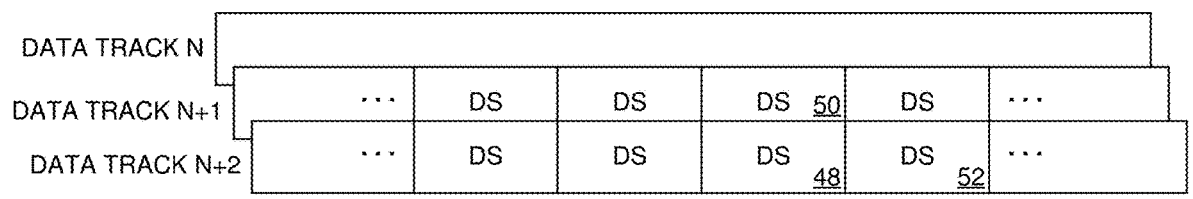
FIG. 6C shows rewriting part of the first codeword that was overwritten by the SMR partial rewrite of the corrupted second codeword.

FIG. 6A shows an example embodiment wherein when an off-track condition occurs while SMR writing data track N+2, the current write operation may be completed rather than aborted as in FIG. 5A. For example, in one embodiment after moving off track during the write to data track N+2, the head may move back on track allowing the write operation to be completed (e.g., data sectors 48 and 52 may be written during the current write operation even though an off-track condition occurred while writing data sector 48). After completing the write operation to data track N+2, the corrupted data sector 50 in data track N+1 may be rewritten by executing a partial write of the corresponding codeword(s) as shown in FIG. 6B. Rewriting the corrupted data sector 50 using SMR means that the previously written data sector 48 in data track N+2 is partially overwritten as shown in FIG. 6B. Accordingly in one embodiment, after rewriting the corrupted data sector(s), a partial write of the codeword(s) is executed in order to rewrite the corresponding data sector(s) in data track N+2 (e.g., data sector 48 may be rewritten as shown in FIG. 6C).

FIG. 7A shows an embodiment wherein a CMR write operation to data track N+1 is aborted at data sector 54 due to an off-track condition that corrupts the adjacent data sector 56. In one embodiment after aborting the CMR write operation to data track N+1 the write operation may be re-executed by performing a partial write of the corresponding codeword (again to data track N+1). The retry write operation (including partial write when applicable) may be executed multiple times until the write operation is successfully completed while concurrently flagging the corrupted adjacent data sectors due to off-track conditions. After successfully completing the write operation to data track N+1, the data sectors corrupted by any off-track writes (e.g., data sector 56) are rewritten by executing a partial write of the corresponding codewords. FIG. 7B shows an embodiment wherein adjacent data sectors 56 and 58 in both adjacent data tracks may be flagged as potentially corrupted during a write (or retry write) to data track N+1. Similar to the embodiment described above, when CMR writing to a data track there may be a first threshold employed to flag potentially corrupted adjacent data sectors without aborting a write operation, and a second, higher threshold to both flag potentially corrupted adjacent data sectors as well as abort the write operation.

In one embodiment, rewriting only the corrupted data sectors of an adjacent data track by executing partial writes of the corresponding codeword(s) avoids rewriting the uncorrupted data sectors of the codeword(s). That is, if an entire codeword is rewritten in order to rewrite a single corrupted data sector within the codeword, it risks the possibility of an off-track write (while writing the uncorrupted data sectors), thereby corrupting or at least degrading the adjacent data sectors of the adjacent data track. In other words, rewriting only the corrupted data sectors within a codeword limits the amount of adjacent track interference as compared to rewriting the entire codeword.

In one embodiment, an off-track condition may be detected during a write operation in any suitable manner, such as by detecting when the PES generated from reading the servo sectors exceeds a threshold, when the output of a shock detector exceeds a threshold, etc. In one embodiment, when an off-track condition is detected during a write operation the location of the corresponding adjacent data sector is saved so that it may be rewritten by partially rewriting the corresponding codeword. The location of the adjacent data sector may be saved whether or not the current write operation is aborted. For example, the location of adjacent data sector 50 may be saved in the embodiment of FIG. 5A where the write operation is aborted or in the embodiment of FIG. 6A where the write operation continues. In one embodiment, an off-track metric may be compared to multiple thresholds, such as a lower threshold that may trigger a rewrite of an adjacent data sector without aborting a current write operation, and a higher threshold which may trigger a write abort in addition to a rewrite of an adjacent data sector.

In one embodiment, a retry read of a potentially corrupted data sector (e.g., data sector 50 in FIG. 5A or 6A) may be executed to determine whether it is necessary to rewrite the data sector. In one embodiment, the retry read may attempt to read the potentially corrupt data sector and evaluate the quality of the read signal to determine the soundness of the data sector. In another embodiment, the retry read may attempt to read the codeword that includes the potentially corrupt data sector and determine the soundness of the data sector based on the recoverability of the codeword. For example if decoding the codeword fails or if it requires an excessive number of iterations, the potentially corrupt data sector may be considered corrupted and therefore rewritten. In one embodiment when decoding of the codeword fails, the previously buffered user data (e.g., with SMR) may be re-encoded into the codeword which is then partially written in order to rewrite the corrupted data sector. In another embodiment, when decoding of a codeword fails the codeword may be recovered using a higher level of redundancy, such as track level redundancy capable of recovering an unrecoverable codeword. Once recovered, the codeword may be partially written in order to rewrite the corrupted data sector(s).

In one embodiment, a retry read of a potentially corrupt data sector may be executed regardless as to whether it is flagged by detecting an off-track condition during a write operation of an adjacent data track. Referring to the example of FIG. 6A, a retry read of the previously written data track N+1 may be executed after completing the write to data track N+2 regardless as to whether an off-track condition is detected. In this embodiment, corrupted data sectors may be detected by evaluating the quality of the read signal when reading each data sector and/or the recoverability of the corresponding codeword. For example, when a codeword fails to decode or requires excessive iterations to decode, the decoding metrics (e.g., log likelihood ratios (LLRs)) of each data sector may be evaluated in order to detect the corrupted data sector(s).

In one embodiment in order to limit the amount of adjacent track interference during write operations, one or more fake writes may be executed to a data track prior to executing a real write. During a fake write, the head is servoed over the target data track without actually writing data to the data track, an example of which is shown in FIG. 8A wherein the shaded data sectors represent the unwritten (but targeted) data sectors. When an off-track condition is detected during a fake write, the fake write may be repeated such as shown in FIG. 8B until an off-track condition is no longer detected. Thereafter a real write may be executed in order to actually write data to the target data sectors as shown in FIG. 8C.

Figure 9A:
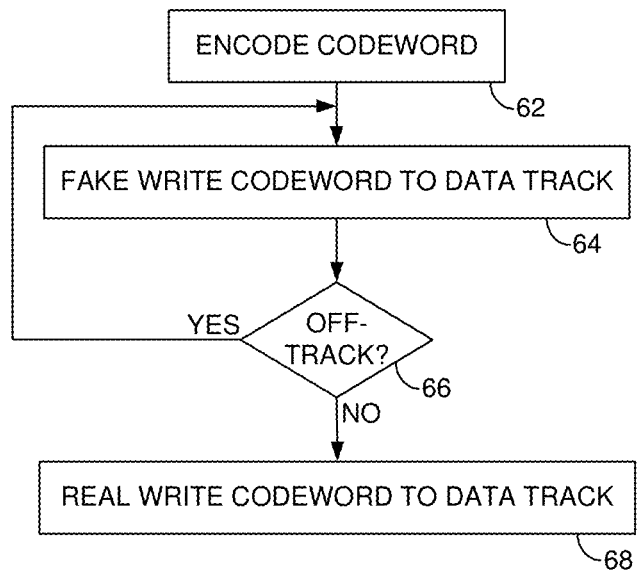
FIG. 9A is a flow diagram according to an embodiment wherein the codeword is not re-encoded prior to the retry fake writes or prior to the real write.
Figure 9B:
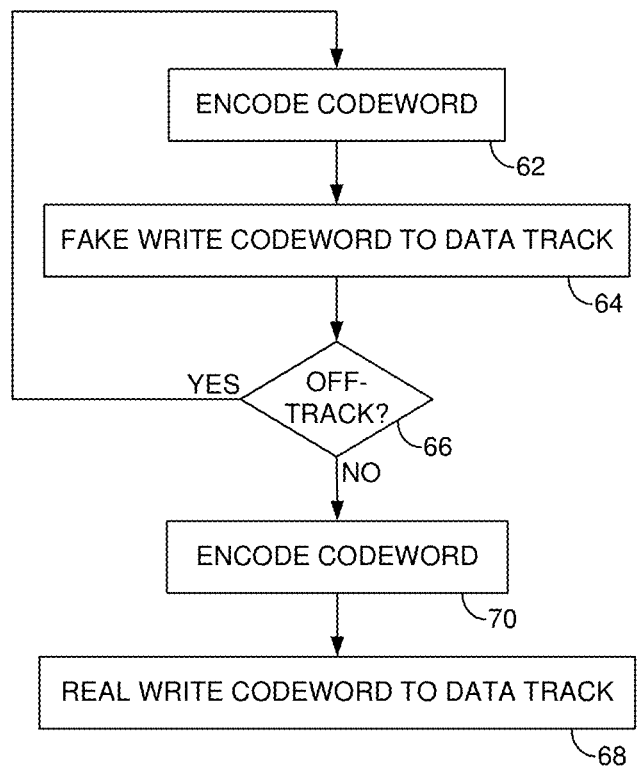
FIG. 9B is s flow diagram according to an embodiment wherein the codeword is re-encoded prior to the retry fake writes and prior to the real write.

FIG. 9A is a flow diagram according to this embodiment wherein data is encoded into a codeword (block 62) and then a fake write of the codeword is executed (block 64). If an off-track condition is detected (block 66), the fake write is re-executed until an off-track condition is not detected at block 66. A real write is then executed in order to write the codeword to the data track (block 68). In this embodiment, a codeword may be written to a single data sector or to multiple data sectors as described above. In one embodiment shown in the flow diagram of FIG. 9B, the codeword may be re-encoded at block 62 prior to executing a retry fake write as well as re-encoded at block 70 prior to executing the real write at block 68. This embodiment may simplify implementation and/or reduce the needed cache capacity by performing the same operations for the fake writes and the real write.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power circuit(s) and/or a suitable preamp circuit(s) implemented as separate integrated circuits, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a magnetic media comprising a plurality of data tracks, wherein each data track comprises a plurality of data sectors;
    a head actuated over the magnetic media; and
    control circuitry configured to:
        encode a first codeword;
        write the first codeword to multiple data sectors of a first data track including a first data sector;
        encode a second codeword;
        write at least part of the second codeword to multiple data sectors of a second data track adjacent the first data track including a second data sector adjacent the first data sector of the first data track;
        re-encode the first codeword; and
        partially write the re-encoded first codeword to at least the first data sector of the first data track when the first data sector of the first data track is corrupted by writing the second codeword to the second data track.

2. The data storage device as recited in claim 1, wherein the control circuitry is further configured to:
    encode a third codeword;
    write a first part of the first codeword to the first data sector of the first data track; and
    write a first part of the third codeword to the first data sector of the first data track.

3. The data storage device as recited in claim 1, wherein the control circuitry is further configured to detect the first data sector being corrupted by executing a read-verify of the first data track.

4. The data storage device as recited in claim 1, wherein the control circuitry is further configured to detect the first data sector being corrupted by detecting an off-track condition when writing the second codeword to the second data track.

5. The data storage device as recited in claim 4, wherein the control circuitry is further configured to abort the writing of the second codeword to the second data track when the off-track condition is detected.

6. The data storage device as recited in claim 5, wherein after partially writing the re-encoded first codeword, the control circuitry is further configured to partially write a remaining part of the first codeword to the first data track.

7. The data storage device as recited in claim 4, wherein the control circuitry is further configured to complete the writing of the second codeword to the second data track when the off-track condition is detected.

8. The data storage device as recited in claim 7, wherein after partially writing the re-encoded first codeword, the control circuitry is further configured to partially write the second codeword to the second data sector of the second data track.

9. A data storage device comprising:
    a magnetic media comprising a plurality of data tracks, wherein each data track comprises a plurality of data sectors;
    a head actuated over the magnetic media; and
    control circuitry configured to:
        encode a first codeword;
        write the first codeword to multiple data sectors of a first data track including a first data sector;
        encode a second codeword;
        write at least part of the second codeword to multiple data sectors of a second data track adjacent the first data track including a second data sector adjacent the first data sector of the first data track; and
        partially write the first codeword to at least the first data sector of the first data track when the first data sector of the first data track is corrupted by writing the second codeword to the second data track.

10. The data storage device as recited in claim 9, wherein the control circuitry is further configured to:
    encode a third codeword;
    write a first part of the first codeword to the first data sector of the first data track; and
    write a first part of the third codeword to the first data sector of the first data track.

11. The data storage device as recited in claim 9, wherein the control circuitry is further configured to detect the first data sector being corrupted by executing a read-verify of the first data track.

12. The data storage device as recited in claim 9, wherein the control circuitry is further configured to detect the first data sector being corrupted by detecting an off-track condition when writing the second codeword to the second data track.

13. The data storage device as recited in claim 12, wherein the control circuitry is further configured to abort the writing of the second codeword to the second data track when the off-track condition is detected.

14. The data storage device as recited in claim 13, wherein after partially writing the first codeword, the control circuitry is further configured to partially write a remaining part of the first codeword to the first data track.

15. The data storage device as recited in claim 12, wherein the control circuitry is further configured to complete the writing of the second codeword to the second data track when the off-track condition is detected.

16. The data storage device as recited in claim 15, wherein after partially writing the first codeword, the control circuitry is further configured to partially write the second codeword to the second data sector of the second data track.

17. A data storage device comprising:
- a magnetic media comprising a plurality of data tracks, wherein each data track comprises a plurality of data sectors;
- a head actuated over the magnetic media; and
- control circuitry configured to:
  - encode a first codeword;
  - first fake write at least part of the first codeword to multiple data sectors of a first data track;
  - when an off-track condition is detected during the first fake write, second fake write at least part of the first codeword to the multiple data sectors of the first data track; and
  - when an off-track condition is not detected during the second fake write, real write the first codeword to the multiple data sectors of the first data track.

18. The data storage device as recited in claim 17, wherein the control circuitry is further configured to re-encode the first codeword prior to the second fake write.

19. The data storage device as recited in claim 17, wherein the control circuitry is further configured to re-encode the first codeword prior to the real write.

\* \* \* \* \*